United States Patent
Hrecznyj et al.

(10) Patent No.: US 12,235,055 B2
(45) Date of Patent: Feb. 25, 2025

(54) COUPLING ARRANGEMENT OF A THERMAL CONNECTION FOR A VEHICLE

(71) Applicant: Ford Global Technologies, LLC, Dearborn, MI (US)

(72) Inventors: Michael Hrecznyj, Livonia, MI (US); Michael M. Azzouz, Farmington, MI (US); Scott Nydam, Farmington Hills, MI (US); Clay Wesley Maranville, Ypsilanti, MI (US); Chris Robert Sculthorpe, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 348 days.

(21) Appl. No.: 18/073,833

(22) Filed: Dec. 2, 2022

(65) Prior Publication Data
US 2024/0183626 A1 Jun. 6, 2024

(51) Int. Cl.
*F28F 9/02* (2006.01)
*B60H 1/00* (2006.01)
*F25D 15/00* (2006.01)

(52) U.S. Cl.
CPC ....... *F28F 9/0258* (2013.01); *B60H 1/00271* (2013.01); *F25D 15/00* (2013.01);
(Continued)

(58) Field of Classification Search
CPC ............ B60H 1/00271; B60H 1/00507; B60H 1/00564; B60H 1/00264; B60H 2001/003;
(Continued)

(56) References Cited

U.S. PATENT DOCUMENTS 3,850,006 A 11/1974 Redfern et al.
3,916,639 A * 11/1975 Atkinson ............... B60N 3/104
 62/331

(Continued)

FOREIGN PATENT DOCUMENTS

CN 102320257 A 1/2012
DE 102012204160 A1 9/2013
(Continued)

OTHER PUBLICATIONS

Tesla Model S Front Trunk (Frunk) Electric Cooler Review, 9 pages, posted on Jan. 31, 2014, www.teslarati.com/tesla-model-s-front-trunk-frunk-cooler/.

*Primary Examiner* — Joseph F Trpisovsky
(74) *Attorney, Agent, or Firm* — Vichit Chea; Price Heneveld LLP

(57) ABSTRACT

A coupling assembly for a vehicle includes a container selectively coupled with a compartment of the vehicle. The container includes at least one first port in fluid communication with an interior of the container. At least one second port is disposed on a wall of the compartment and is in fluid communication with a climate control system in the vehicle. A connection assembly is between the container and the wall. The connection assembly includes a positioning feature configured to align the at least one first port with the at least one second port. The connection assembly further includes a securing feature configured to bias the container toward the wall when the container is coupled with the wall to maintain fluid communication between the interior and the climate control system.

20 Claims, 4 Drawing Sheets

(52) U.S. Cl.
CPC ........ *F28F 9/0253* (2013.01); *B60H 1/00264* (2013.01); *B60H 1/00564* (2013.01)

(58) Field of Classification Search
CPC .......... F25D 15/00; F25D 17/04; F25D 17/06; F25D 19/006; F25D 19/02; F25D 2317/06; F25D 2317/063; F25D 2317/065; F25D 2317/066; F25D 2317/067; F25D 2317/0671; F25D 2317/0672; F28F 9/0258; F28F 9/0253
See application file for complete search history.

(56) References Cited

U.S. PATENT DOCUMENTS

| | | |
|---|---|---|
| 4,637,222 A | 1/1987 | Fujiwara et al. |
| 4,765,151 A * | 8/1988 | Bessey .................... F25D 3/06 62/239 |
| 6,997,004 B1 * | 2/2006 | Pittman .................... B60H 1/32 62/244 |
| 10,232,785 B1 * | 3/2019 | Mullen ................ B60N 2/5628 |
| 10,953,721 B2 | 3/2021 | Gruber |
| 11,148,602 B2 | 10/2021 | Ahlning |
| 11,214,185 B2 * | 1/2022 | Qiu .......................... B60K 1/04 |
| 2008/0148752 A1 * | 6/2008 | Marginean ......... B60H 1/00271 62/434 |
| 2018/0037150 A1 | 2/2018 | Rotharmel |
| 2020/0108688 A1 * | 4/2020 | Gruber ................ H01M 10/656 |
| 2020/0139894 A1 * | 5/2020 | Glickman ................ B60R 5/02 |
| 2023/0138139 A1 * | 5/2023 | Kang ....................... B60P 3/36 454/139 |

FOREIGN PATENT DOCUMENTS

| | | | |
|---|---|---|---|
| DE | 102016203084 A1 | 9/2017 | |
| DE | 102020135071 A1 | 7/2021 | |
| EP | 3075583 A2 * | 10/2016 | ......... B60H 1/00271 |
| WO | 2021245557 A1 | 12/2021 | |

* cited by examiner

COUPLING ARRANGEMENT OF A THERMAL CONNECTION FOR A VEHICLE

FIELD OF THE DISCLOSURE

The present disclosure generally relates to a coupling arrangement for a vehicle and, more particularly, to a coupling assembly for selectively providing fluid communication between a vehicle and a removable cooler.

BACKGROUND OF THE DISCLOSURE

Compartments for vehicles can be climate controlled. For example, some compartments may be configured for heating or cooling items in the compartment. Alternatively, a climate controlled case may be disposed in a dedicated location in the vehicle. However, conventional climate controlled cases do not typically couple with onboard heating or cooling devices associated with the vehicle. Further, typical climate controlled cases are not effectively secured or easily aligned at a connection point between the case and the vehicle. A need is presented for a dynamic arrangement that allows for simple and effective interfacing between the casing and the vehicle.

SUMMARY OF THE DISCLOSURE

According to a first aspect of the present disclosure, a coupling assembly for a vehicle includes a container selectively coupled with a compartment of the vehicle. The container includes at least one first port in fluid communication with an interior of the container. At least one second port is disposed on a wall of the compartment and is in fluid communication with a climate control system in the vehicle. A connection assembly is between the container and the wall. The connection assembly includes a positioning feature configured to align the at least one first port with the at least one second port. The connection assembly further includes a securing feature configured to bias the container toward the wall when the container is coupled with the wall to maintain fluid communication between the interior and the climate control system.

Embodiments of the first aspect of the present disclosure can include any one or a combination of the following features:
- the positioning feature includes an indentation formed on one of the wall and the container and a protrusion extending from another of the wall and the container and engaging the indentation;
- the protrusion extends from the container, and wherein the at least one first port extends from the protrusion;
- the securing includes a lip extending outwardly from the protrusion and a ledge defining a groove formed on the wall, wherein the lip is configured to engage the groove;
- the ledge includes a first mating surface extending at an oblique angle from the container for engaging the first mating surface, and wherein the lip includes a second mating surface extending at an oblique angle toward the groove;
- the securing feature includes a magnetic connection having a ferromagnetic element disposed in the container and a magnet disposed in the wall;
- the ferromagnetic element is disposed proximate to the at least one first port and the magnet is disposed proximate to the at least one second port;
- the ferromagnetic element is disposed about a periphery of the at least one first port and the magnet is disposed about a periphery of the at least one second port;
- the securing feature includes a plurality of flanges and a plurality of slots, wherein the plurality of flanges is disposed on the at least one second port and the plurality of slots is defined the least one first port;
- the plurality of flanges engages the plurality of slots when the container engages the wall;
- the plurality of slots are formed via a plurality of ribs spaced about a periphery of the at least one first port, and wherein the plurality of flanges are configured to movably engage the plurality of ribs via a rotation of plurality of flanges about a central portion of the at least one second port;
- a transmission assembly disposed in the wall and operably coupled with the plurality of flanges for controlling the rotation;
- the transmission assembly includes a drive gear and a receiving gear, wherein the receiving gear is fixed with the plurality of flanges and the drive gear is operably coupled with the receiving gear to rotate the receiving gear;
- the transmission assembly further includes an actuation device configured to actuate the drive gear in response to an electrical or a mechanical input;
- proximity sensor configured to detect a position of the container, wherein a controller of the climate control system is configured to communicate a signal to the actuation device to actuate the drive gear to lock the plurality of flanges with the plurality of ribs in response to the container engaging the wall;
- a cover for selectively closing the second fluid port; and a lever member configured disposed on the wall and coupling with the cover, wherein the lever member is configured to move the cover to selectively block and allow fluid connection between the interior and the climate control system in response to the cooler engaging the wall; and
- a biasing member biasing the lever member to block the fluid connection, wherein engaging of the cooler with the lever member moves the lever member to allow the fluid connection.

According to a second aspect of the present disclosure, a coupling assembly for a vehicle includes a cooler selectively coupling with a compartment of the vehicle and including a protrusion extends from a sidewall of the cooler. The cooler includes at least one first port disposed on the protrusion and in fluid communication with an interior of the cooler. An indentation is formed by a wall of the compartment. The wall includes at least one second port in fluid communication with a climate control system in the vehicle. A securing feature is configured to bias the cooler toward the wall when the cooler is coupled with the wall to maintain fluid communication between the interior and the climate control system. The protrusion engages the indentation to align the cooler with the wall.

Embodiments of the second aspect of the present disclosure can include any one or a combination of the following features:
- the securing feature includes a magnetic connection having a ferromagnetic element disposed in the cooler and a magnet disposed in the wall.

According to a third aspect of the present disclosure, a coupling assembly for a vehicle includes a cooler selectively coupled with a compartment of the vehicle. The cooler includes a first port in fluid communication with an interior of the cooler. A second port is disposed on a wall of the compartment in fluid communication with a climate control system in the vehicle. A magnetic connection is between the wall and the cooler. A positioning feature is configured to align the magnetic connection. The magnetic connection includes a ferromagnetic element disposed about the inlet port and a magnet disposed about the second port.

These and other features, advantages, and objects of the present invention will be further understood and appreciated by those skilled in the art by reference to the following specification, claims, and appended drawings.

DETAILED DESCRIPTION OF PREFERRED EMBODIMENTS

Figure 1:
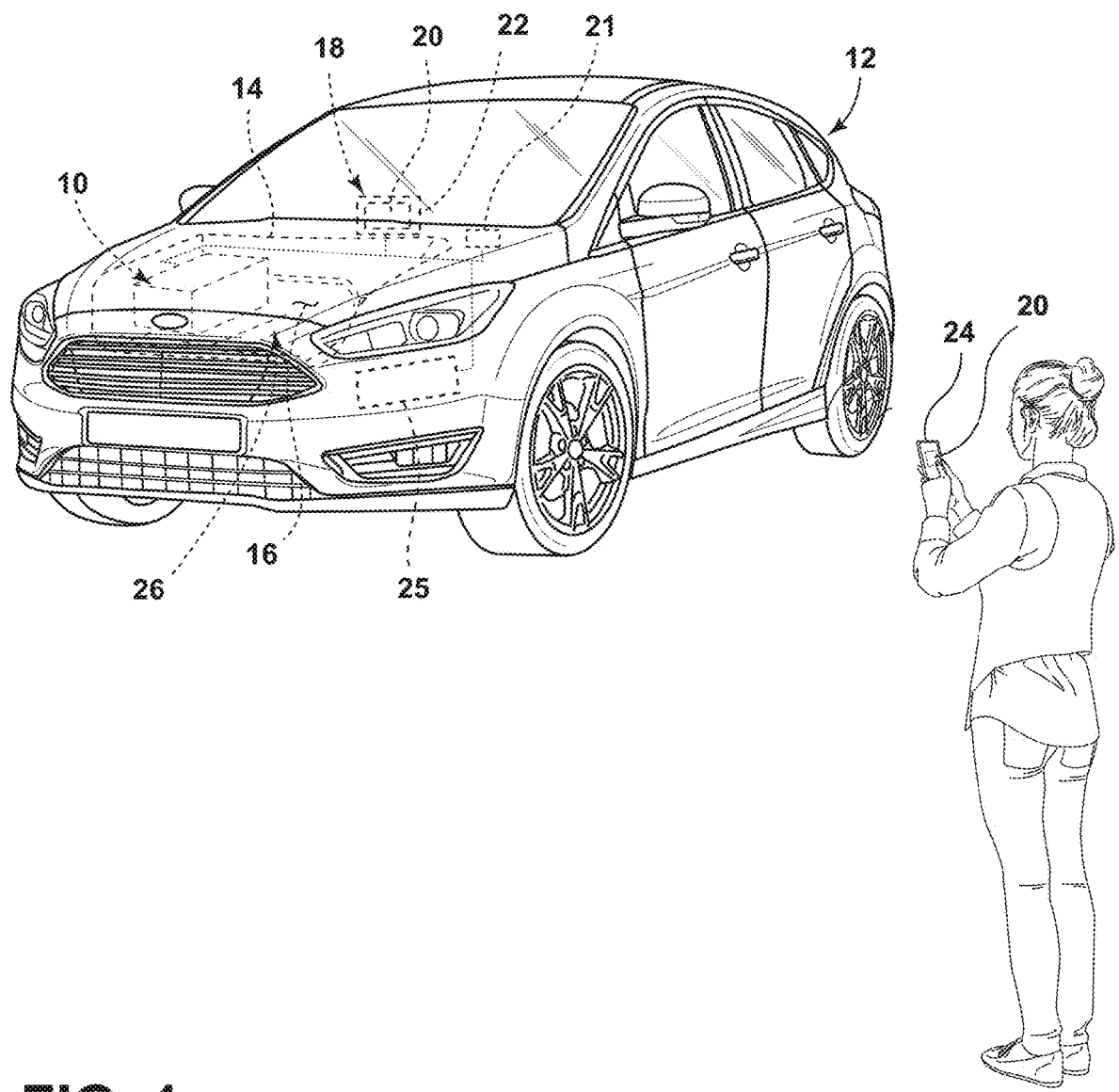
FIG. 1 is a perspective view of a vehicle incorporating a coupling assembly for a thermal connection of the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to coupling arrangement of a thermal connection for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In general, the present disclosure may provide for a climate-controlled thermal structure selectively disposed in an interior space of a vehicle. The interior space may be a preformed cavity within the vehicle that is capable of housing the thermal structure, such as a cooler, and securing the thermal structure to a structure that defines the interior space (e.g., an outer wall of the cavity). The thermal structure may be permanently or temporarily secured with the outer wall or otherwise within the interior space, such that the thermal structure may be removable from the interior space or configured to be kept in the interior space. In examples in which the thermal structure may be removed from the interior space (e.g., a portable cooler), an environment of the interior space may be climate-controlled. In this way, environmental conditions of the interior space as a whole and/or environmental conditions of an expandable or removable thermal structure may be controlled.

Referring generally to the figures, the present disclosure provides for a coupling assembly 10 for use between a vehicle 12 and a thermal container 13. Although generally illustrated in the figures as being incorporated with a front trunk of the vehicle 12, also commonly referred to as a frunk of an electric vehicle, it is contemplated that the coupling assembly 10 of the present disclosure may be incorporated with any compartment 14 of the vehicle 12 and is not limited to the front trunk of the vehicle 12. For example, the compartment 14 may be a passenger compartment, trunk compartment, or any other area or exterior cavity disposed in the vehicle 12. In general, the compartment 14 may form a thermally insulated space 16, which may be climate controlled via a climate control system 18 having at least one interface 20 for controlling environmental attributes of the space 16. For example, the climate control system 18 may be configured to control a temperature, a humidity, an airspeed, or the like in or through the space 16 via a controller 21 of or in communication with the climate control system 18. For example, the controller 21 may be configured to adjust fluid communication between the climate control system 18 and the container 13. The at least one user interface 20 may be incorporated into a human-machine interface (HMI) 22 associated with a cabin of the vehicle 12 and/or may be incorporated into a mobile device 24, such as a phone, tablet, laptop, etc., for controlling the space 16 while inside or outside of the vehicle 12.

Although not shown in detail, the climate control system 18 may incorporate various heat control devices, such as a heat exchanger, that are configured to interface with the container 13 of the present disclosure. In some examples, the climate control system 18 includes a heat control source 25 disposed in the vehicle 12 that is configured to control hot or cold air to be delivered to the compartment 14 or the thermally-insulated structure (e.g., the thermal container 13). For example, the climate control system 18 may include multiple heat exchangers and/or multiple sub climate control systems that allow isolated or combined control for one or more compartments 14 of the vehicle 12. In general, the climate control system 18 may be configured to provide cool or warm air toward the compartment 14. For example, the climate control system 18 may supply cool air and return warm air in order to reduce the temperature of the compartment 14 or devices in the compartment 14. As will be further described herein, a cooler or other structure may cover inlets and/or outlets of the climate control system 18 in the compartment 14 in order to heat or cool the cooler or other thermal structure.

In some examples, the climate control system 18 includes a dedicated heat pump system or another subsystem such as a heating, ventilation, and air conditioning (HVAC) system of the vehicle 12. In one example, the climate control system 18 is a dedicated dual-box heat pump system (e.g., a compact vehicle thermal management system (CVTMS)). Other exemplary thermal management systems may be employed to provide cool air to a cooler, a thermal box, or another structure in order to allow the thermal structure to utilize the climate control system 18 of the vehicle 12 to manage/control thermal properties inside of the cooler.

Figure 2:
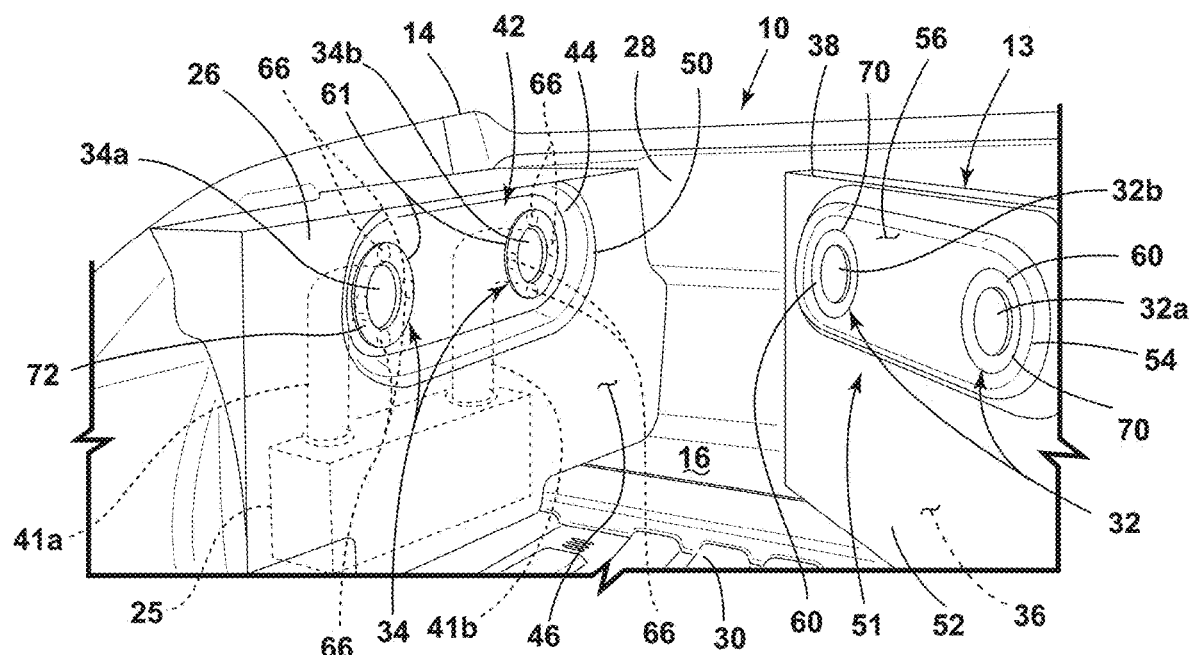
FIG. 2 is a perspective view of a coupling assembly between a compartment of a vehicle and a thermal container according to one aspect of the present disclosure.
Figure 3:
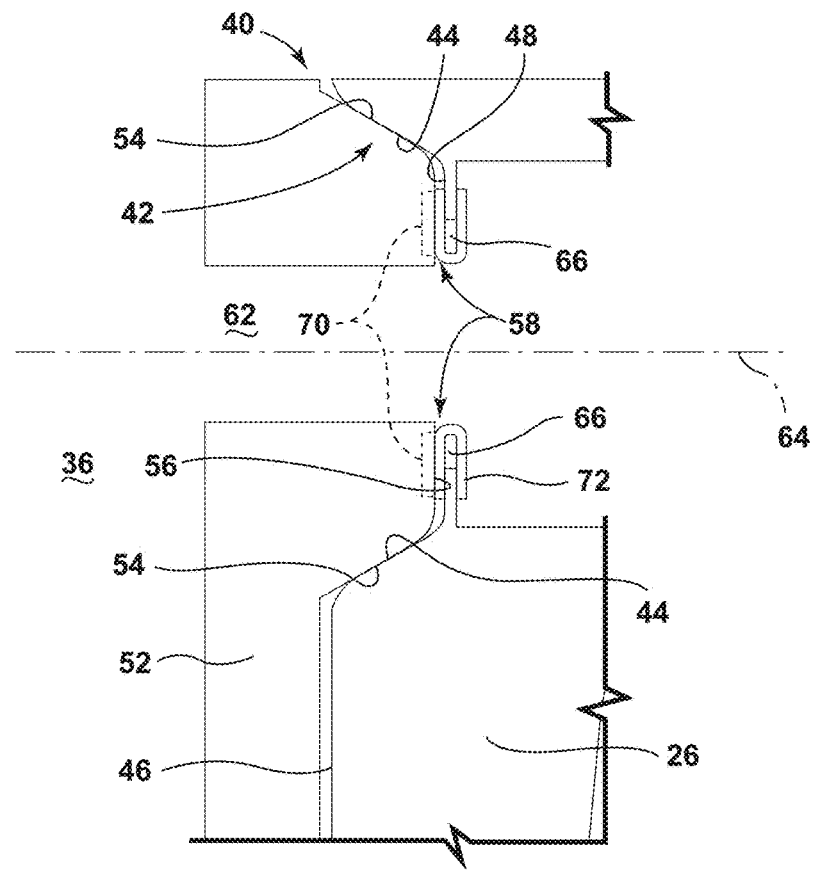
FIG. 3 is a cross-sectional view of the coupling assembly of FIG. 2 taken at a fluid port of the coupling assembly when the coupling is coupled with the compartment of the vehicle.

Referring now to FIGS. 2 and 3, the compartment 14 may include a wall 26, 28, such as a lateral wall 26 and a back wall 28 that each extend upwardly from the floor 30 of the compartment 14. The coupling arrangement of the present disclosure includes one or more first ports 32 disposed on the container 13 and one or more seconds ports 34 disposed on the wall 26, 28. When aligned and coupled with one another, the first and second ports 32, 34 provide fluid communication between an interior 36 of the container 13 and the climate control system 18 of the vehicle 12. The container 13 may be a cooler or another thermally managed device that is operable to limit heat transfer through a body 38 of the container 13. In general, the coupling assembly 10 of the present disclosure may include a connection assembly 40 that provides for aligning and maintaining connection of the container 13 with the climate control system 18 of the vehicle 12 to allow the interior 36 to be thermally managed by the climate control system 18.

The one or more first ports 32 may include a first inlet port 32a and a first outlet port 32b, and the one or more second ports 34 may include a second inlet port 34a and a second outlet port 34b. When the climate control system 18 is configured to cool the container 13, for example, cool air may be communicated through the inlet ports 32a, 34a to the interior 36 and warm air may be returned from the container 13 via the outlet ports 32b, 34b. It is contemplated that the inlet ports 32a, 34a and outlet ports 32b, 34b may be referred to as conduits, and such conduits may serve as pipes or other fluid retaining mechanisms that couple with the heat control device 25 previously described. For example, inlet and outlet conduits 41a, 41b may interpose the heat control source 25 and the second ports 34a, 34b.

Still referring to FIGS. 2 and 3, the second ports 34 may be recessed in the wall 26, 28 by an indentation 42 extending into the wall 26, 28 and away from the space 16 of the compartment 14. As illustrated, the indentation 42 may have an oblong shape and include an inclined surface 44 that extends between an outer surface 46 of the wall 26, 28 and a recessed surface 48 of the wall 26, 28. The inclined surface 44 may extend about a perimeter 50 of the indentation 42 and have a shape that generally correlates to a shape of a protrusion 51 on the container 13. For example, as illustrated, the protrusion 51 may extend from a sidewall 52 of the body 38 of the container 13, such as a rear wall 28 of the container 13, and include a ramped surface 54 that extends from the sidewall 52 to a protruding surface 56. The first ports 32 are disposed on the protruding surface 56 and the second ports 34 are disposed on the recessed surface 48.

As illustrated in FIG. 3, when the container 13 engages the compartment 14, the ramped surface 54 engages the inclined surface 44 along the perimeter 50 of the indentation 42 to generally align the first ports 32 with the second ports 34. For example, the inclined surface 44 may extend at an oblique angle relative to the outer surface 46 and the ramped surface 54 may extend that at an oblique angle relative to the sidewall 52. The angles at which the ramped surface 54 and the inclined surfaces 44 extend may generally be equal or substantially equal to one another, such that the inclined surface 44 and the ramped surfaces 54 contact one another when the container 13 is aligned with the wall 26, 28. The inclined surfaces 44, the protrusion 51, and the indentation 42 may generally serve as positioning features for aligning the first ports 32 with the second ports 34. Such positioning features may be part of the connection assembly 40 of the coupling assembly 10 that is disposed between the container 13 and the compartment 14.

Still referring to FIGS. 2 and 3, the connection assembly 40 further includes a securing feature that is operable to lock or hold the container 13 with the wall 26, 28 of the compartment 14. As illustrated in FIGS. 2 and 3, the securing feature may include a magnetic connection 58 disposed about a first periphery 60 of the first ports 32 and a second periphery 61 of the second ports 34 for aligning a central portion 62 of the ports 32, 34. For example, the first and second ports 32, 34 may be generally tubular in shape and extend along a central axis 64. In one example, the magnetic connection 58 includes at least one magnet 66 so disposed about the second periphery 61 and at least one ferromagnetic element 70 disposed about the first periphery 60. In the example illustrated, each of the first ports 32 includes the ferromagnetic element 70 and each of the second ports 34 includes the magnet 66. In this example, each first port 32 may have a unitary ferromagnetic element 70 extending about a circumference of the first ports 32 or a plurality of ferromagnetic elements 70 distributed about the second periphery 61. Further, each second port 36 may include a unitary magnetic element or a plurality of magnets 66 spaced circumferentially about the second periphery 61 of each second port 34a, 34b. It is contemplated that the ferromagnetic element 70 may include steel or another alloy that is responsive to a magnetic field to cause an attraction or force to the magnet 66. In some examples, the magnets 66 are embedded into the wall 26, 28 of the compartment 14 and the ferromagnetic elements 70 are embedded into the protrusion 51 to form a magnetic joint between the container 13 and the compartment 14. In this way, the magnetic connection 58 may allow for an automatic cooler attachment feature that may require limited user interaction to secure fluid communication between the interior 36 and the climate control system 18.

Referring more particularly to FIG. 3, the second periphery 61 of the second ports 34a, 34b may include a cushioning or an elastic member 72 that circumscribes each second port 34a, 34b and interposes the container 13 and the recessed surface 48. In this way, the soft material or overmold 72 provides spacing between the ferromagnetic element 70 and the magnetic element 66 to allow for a push/pull connection for a user to effectively attach or detach the cooler 13 from the wall 26, 28. The spacer 72, or the cushioning material, may limit air from escaping the inlet/outlet connection into the compartment 14. In this way, the spacer 72 may allow for sealing of the connection.

As will be described in the foregoing figures, it is contemplated that the coupling arrangement 10 may also incorporate selectively openable/closable valves/shutters within either or both of the container 13 and the compartment 14. For example, the second ports 34a, 34b may include closure members that, upon connection with the container 13, open to provide fluid communication between the interior 36 and the climate control system 18. In other examples, the closure members are controlled electronically and may be configured to open in response to the container 13 being engaged or disengaged to allow climate control of the compartment 14 or the container 13 selectively depending on preference by the user.

Figure 4:
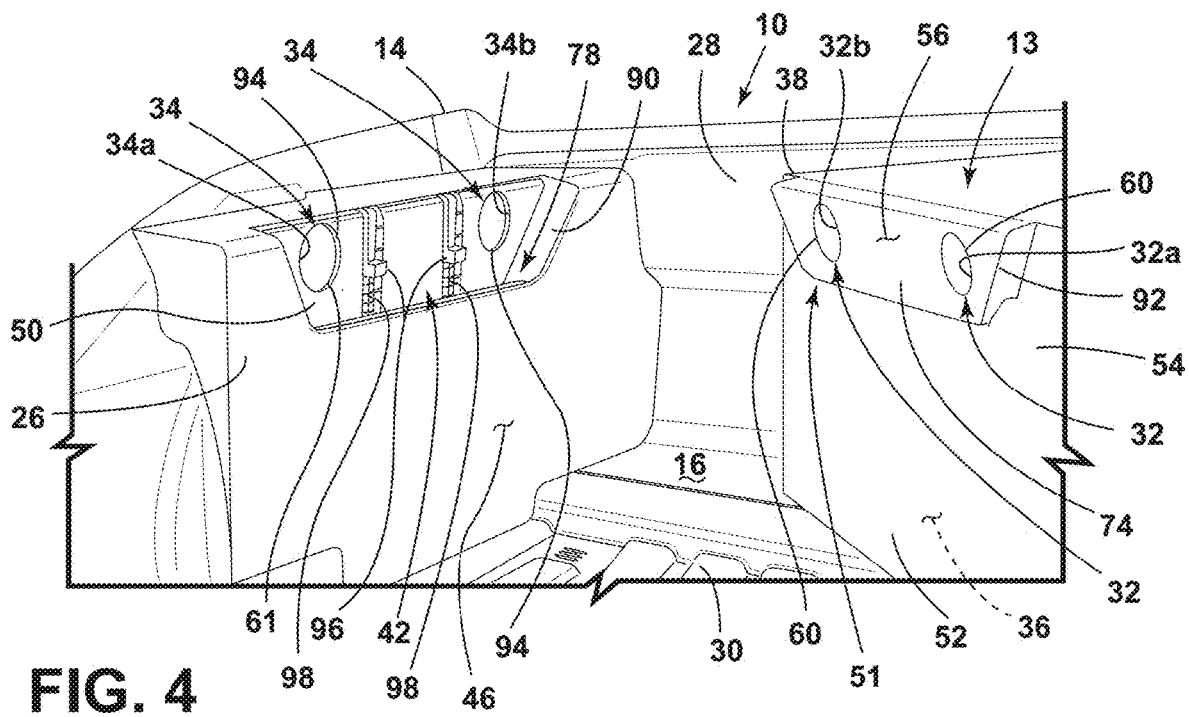
FIG. 4 is a perspective view of a coupling assembly between a compartment of a vehicle and a container of a thermal management system according to one aspect of the present disclosure.
Figure 5:
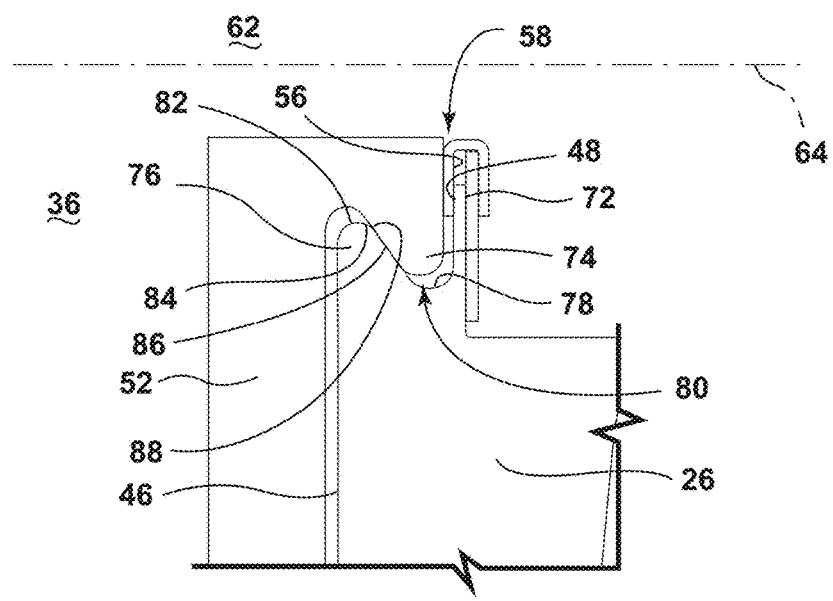
FIG. 5 is a cross-sectional view of the coupling assembly of FIG. 4 taken at a fluid port of the coupling assembly when the container is coupled with the compartment of the vehicle.

Referring now to FIGS. 4 and 5, another example of the coupling assembly 10 is illustrated having a connection assembly 40 that employs mechanical leverage to align and/or secure the container 13 with the compartment 14. In this example, the securing mechanism includes a lip 74 that extends outwardly from the protrusion, as well as a ledge 76 that is defined by a groove 78 formed in the indentation 42 of the wall 26, 28. The ledge 76 and the lip 74 may form a mating connection, such that when the container 13 is lifted and slid into the indentation 42. The weight of the container 13 may cause the container 13 to fall or move toward the floor 30 to cause the lip 74 to hook onto or otherwise latch with the ledge 76. Thus, in this example, the positioning mechanism of the connection assembly 40 provides for lateral alignment of the container 13 to limit movement away from the lateral wall 26. The securing feature of the connection assembly 40 includes an interaction of two vertices 82, 84 of the lip 74 and the ledge 76, respectively. In this example, a first vertex 82 is formed between the sidewall 52 of the container 13 and a first mating surface 86 that extends at an oblique angle from the sidewall 52 toward the protrusion surface 56. Thus, the lip 74 may form an overhang of the protrusion that is configured to engage the groove 78 on the wall 26, 28. In particular, a second vertex 84 may be formed within the groove 78 between a second mating surface 88 and the recessed surface 48 of the wall 26, 28, as depicted in FIG. 5.

The positioning feature of the connection assembly 40 in the example illustrated in FIGS. 4 and 5 may further include a pair of opposing sloped surfaces 90 that extend generally toward one another to form a trapezoidal, or semi-triangular shape of the indentation 42. Similarly, the protrusion includes a pair of notched surfaces 92 that are configured to mate with and/or engage the sloped surfaces 90 to laterally align the first ports 32 with the second ports 34 when the casing 13 is coupled with the compartment 14. In operation, when the container 13 is being coupled to the compartment 14, the container 13 slides downwardly into the notch and is aligned in the notch via engagement with the sloped surfaces 90. As the container 13 moves downwardly and the lip 74 engages the ledge 76, the first ports 32 become centrally aligned with the second ports 34. The spacer 72 of the examples illustrated in FIGS. 2 and 3 may also be incorporated with the second ports 34 to limit air dissipation into the compartment 14 when the container 13 is coupled with the compartment 14. It is contemplated that, although illustrated as being leveraged in the downward direction with the help of gravity, it is contemplated that the lip-ledge connection may be incorporated along lateral walls 26, and the sloped surfaces 90/notched surfaces 92 may be formed along upper or lower portions of the protrusion/indentation 42, such that a user may manipulate the container 13 to first align the first and second ports 32, 34 vertically, then laterally align the first and second ports 32, 34 upon engagement of the lip 74 and the ledge 76. However, in the example described as shown, the floor 30 may serve as a support surface for the container 13 to limit movement of the container 13 within the space 16 when coupled with the wall 26, 28. It is contemplated that the wedge arrangement between the container 13 and the wall 26, 28 may be applied in the four-aft positions as opposed to the vertical fit to limit lifting of the container 13 by user.

Still referring to FIGS. 4 and 5, each of the second ports 34a, 34b may include a cover 94, as previously described, disposed within the inlet/outlet conduits 41a, 41b in the wall 26, 28 (see FIG. 2). Each cover 94 may be selectively movable between an open position and a closed position based on a position of a lever feature 96 that is operably coupled with the cover 94. For example, at least one lever feature 96 may be coupled with the covers 94 and be configured to move in response to the container 13, engaging the lever feature 96. For example, downward movement of the lever feature 96 due to engagement of the lip 74 with the lever feature 96 may cause the covers 94 to open, and disengagement of the lever feature 96 by the lip 74 may cause the covers 94 to close. In some examples, a biasing feature 98, such as a spring, may allow the covers 94 to be biased toward the closed position due to the lever feature 96 being biased in an upward direction. In this way, the biasing feature 98 may bias the lever feature 96 to block fluid connection between the space 16 and the climate control system 18, and engaging the lever feature 96 may allow the fluid connection to occur.

It is contemplated that the spring-loaded shutters (e.g., the covers 94) may increase efficiency for thermal management of the compartment 14/the container 13 by automatically limiting fluid communication to the space 16 in response to the container 13 being removed from the wall 26, 28. It is contemplated that the cover 94/lever feature 96 described in relation to FIGS. 4 and 5 may be incorporated into the example illustrated in FIGS. 2 and 3, as well as the example illustrated in FIGS. 6 and 7 as will be further described herein.

Figure 6:
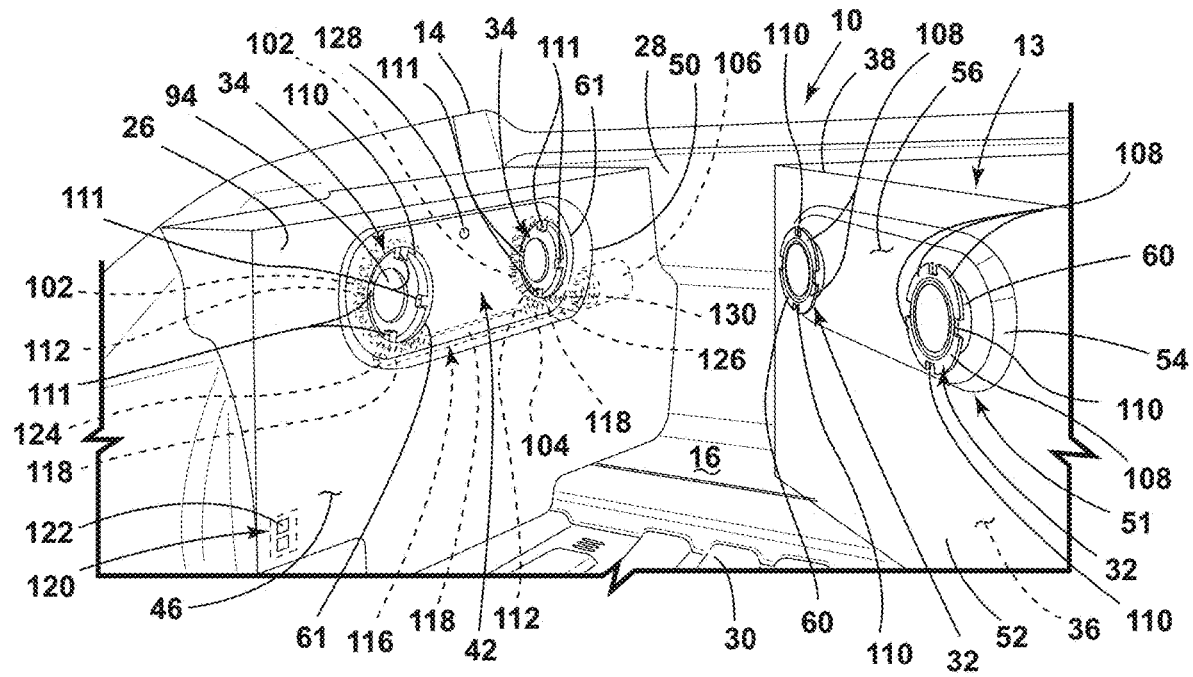
FIG. 6 is a perspective view of one example of a coupling assembly between a compartment of a vehicle and a casing of a thermal management system according to one aspect of the present disclosure.
Figure 7:
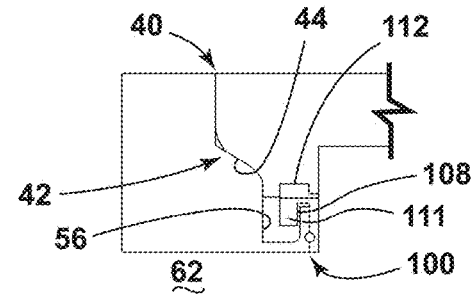
FIG. 7 is a cross-sectional view of the coupling assembly of FIG. 6 taken at a fluid port of the coupling assembly when the casing is coupled with the compartment of the vehicle.
Figure 7:
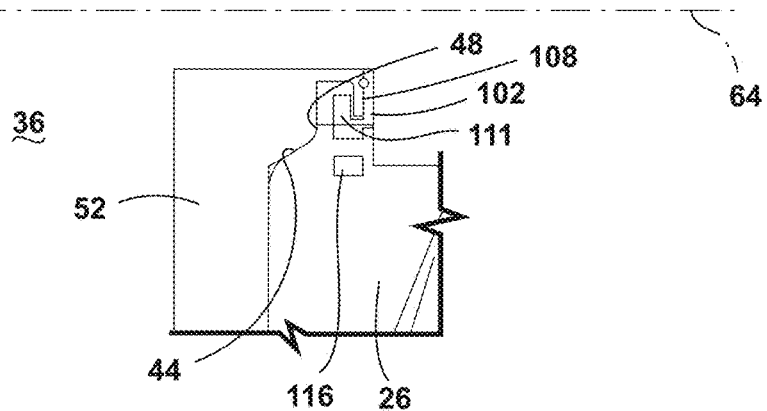

Referring now to FIGS. 6 and 7, another example of the securing feature may include an interlocking assembly 100 that employs a transmission assembly including a plurality of gears 102, 104 and an actuation device 106 for driving the plurality of gears 102, 104 to couple the container 13 with the wall 26, 28. For example, the interlocking connection 100 may include a plurality of ribs 108 that extend radially outwardly about the first periphery 60 of one or both of the first ports 32a, 32b. The plurality of ribs 108 may be circumferentially spaced evenly or unevenly about the first periphery 60 of the first ports 32a, 32b to define a plurality of notches 110 therebetween. A receiving gear 102 may be disposed circumferentially about each second port and be configured to rotate about the central axis 64. A plurality of flanges 111 may extend radially inwardly from an outer portion 112 of the receiving gears 102. When the container 13 engages the wall 26, 28, the plurality of notches 110 and, upon rotation of the receiving gears 102, are configured to rotate behind, or beneath, the plurality of ribs 108 and engage the plurality of ribs 108 to secure the container 13 with the wall 26, 28. The plurality of gears 102, 104 may further include a driving gear 104 that selectively rotates the receiving gears 102 to twist or otherwise rotate the receiving gears 102 to control locking or unlocking of the container 13 with the wall 26, 28.

With continued reference to FIGS. 6 and 7, the transmission assembly may include a rod 116 having gear teeth 118 that operate as the drive gear 104 and engage the receiving gears 102 when the rod 116 is shifted axially. It is contemplated that the outer portion 112 of each receiving gear 102 may be housed within the wall 26, 28 along with the drive gear 104 and the actuation device 106, and that an interface 120 may be provided for controlling the actuation device 106 to move the rod 116 forward or backward to either engage or disengage the container 13 with the wall 26, 28. The actuation device 106 may be a motor, a linear actuator, a valve, or the like, that allows rotational power or linear power to drive the receiving gears 102 to rotate the plurality of phalanges about the central axis 64 to engage the plurality of ribs 108. In general, the actuation device 106 may be operably coupled with a switch 122, a button, or another interface 120 that allows mechanical manipulation of the drive gear 104 to drive the receiving gears 102 to release or to engage the plurality of ribs 108. In other examples, the actuation device 106 may be controlled remotely via the user interface 20 previously described with respect to the mobile device 24, an HMI 20 of the vehicle 12, or the like. In this way, locking of the container 13 with the compartment 14 may be controlled remotely and may be controlled automatically based on user preferences or parameters. Thus, the actuation device 106 may be an electro-mechanical actuator or mechanical switch.

In general, the interlocking assembly 100 of FIGS. 6 and 7 may serve as a twist lock mechanism that may allow for dynamic control of opening and closing of the covers 94 in the second ports 34a, 34b. For example, a cover 94 for one of the second ports 34 (e.g., the inlet) may be closed when the cover 94 for the other of the second ports 34a, 34b (e.g., the outlet port) is open. In other examples, the drive gear 104 is arranged with receiving gears 102 to allow for dual open or dual closed positions depending on the position of the actuation device 106. In other examples, the drive gear 104 (e.g., the gear teeth 118) may be shaped to allow for dead zones along the gear teeth 118 in which the gear teeth 118 do not engage the receiving gears 102. For example, the drive gear 104 may be configured to move between four modes of operation, such that both closure members may be open or both may be closed, the inlet may be open and the outlet closed, and the outlet opening the inlet closed, depending on the linear position of the rod 116. This may be achieved via spacing of the gear teeth 118 along one end 124 of the rod 116 and another end 126 of the rod 116. Thus, various climate controlling to techniques may be applied to the interior 36 when the container 13 is coupled with the wall 26, 28 of the compartment 14.

It is also contemplated that a sensor, such as a proximity sensor 128, may be provided to detect the presence of the container 13 to determine automatic actuation of the actuation device 106 or to allow for mechanical actuation of the actuation device 106, via, e.g., a pushbutton or a lever action by user manipulation. Thus, the climate control system 18 may monitor an input or a signal from the proximity sensor 128 and communicate an instruction to the actuation device 106 in response to the signal from the proximity sensor 128 to actuate the actuation device 106 in response to the container 13 being present or not present. In other examples, the controller 21 may limit actuation of the actuation device 106 if the proximity sensor 128 does not indicate the presence of the container 13, even when such actuation device 106 is a mechanical pushbutton or lever manipulated by the user. For example, the controller 21 may be in communication with a brake or a locking feature 130 that limits movement of the actuation device 106 when the container 13 is not detected by the proximity of the sensor. Although not illustrated in detail in FIGS. 4-7, the conduit connections 41a, 41b may be disposed between the heat control device 25 and the second ports 34a, 34b as previously shown and described with respect to FIGS. 2 and 3.

It is contemplated that the various coupling arrangements described herein may allow for limited user manipulation to allow for coupling and/or decoupling of the container 13 with the compartment 14. For example, the various positioning features (e.g., the indentation 42 and the protrusion 51, the sloped and notched surfaces 90, 92) and the various securing features (e.g., the magnetic connection 58, the lip-ledge connection, or the interlocking connection 100) may provide for a stable connection during transportation. In this way, a more efficient and effective coupling arrangement may be provided to allow selective communication of the interior 36 of the container 13 with the climate control system.

Incorporation of the present coupling assembly 10 and the thermal container 13 in a frunk of the vehicle 12 may provide for greater accessibility and ease of connection with an on-board HVAC system relative to cooperation with other compartments of the vehicle 12, such as the cabin, trunk, or bed of the vehicle 12. For example, the frunk may be proximate to a dashboard of the cabin in which at least one HVAC system of the vehicle 12 may be positioned. In addition, incorporation into the frunk of the vehicle 12 may allow for condensation, spillage, or other fluids to drain from the container 32 to exit the vehicle 12. Further, incorporation of the thermal management system 10 in an area separate from the cabin of the vehicle 12 may allow for selective access to a climate-controlled region separate from the cabin.

It is to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A coupling assembly for a vehicle, comprising:
    a container selectively coupled with a compartment of the vehicle, the container including at least one first port in fluid communication with an interior of the container;
    at least one second port disposed on a wall of the compartment in fluid communication with a climate control system in the vehicle; and
    a connection assembly between the container and the wall, the connection assembly comprising;
        a positioning feature configured to align the at least one first port with the at least one second port; and
        a securing feature configured to bias the container toward the wall when the container is coupled with the wall to maintain fluid communication between the interior and the climate control system.

2. The coupling assembly of claim 1, wherein the positioning feature includes an indentation formed on one of the wall and the container and a protrusion extending from another of the wall and the container and engaging the indentation.

3. The coupling assembly of claim 2, wherein the protrusion extends from the container, and wherein the at least one first port extends from the protrusion.

4. The coupling assembly of claim 3, wherein the securing feature includes a lip extending outwardly from the protrusion and a ledge defining a groove formed on the wall, wherein the lip is configured to engage the groove.

5. The coupling assembly of claim 4, wherein the ledge includes a first mating surface extending at an oblique angle from the container for engaging the first mating surface, and wherein the lip includes a second mating surface extending at an oblique angle toward the groove.

6. The coupling assembly of claim 1, wherein the securing feature includes a magnetic connection having a ferromagnetic element disposed in the container and a magnet disposed in the wall.

7. The coupling assembly of claim 6, wherein the ferromagnetic element is disposed proximate to the at least one first port and the magnet is disposed proximate to the at least one second port.

8. The coupling assembly of claim 7, wherein the ferromagnetic element is disposed about a periphery of the at least one first port and the magnet is disposed about a periphery of the at least one second port.

9. The coupling assembly of claim 1, wherein the securing feature includes a plurality of flanges and a plurality of slots, wherein the plurality of flanges is disposed on the at least one second port and the plurality of slots is defined the least one first port.

10. The coupling assembly of claim 9, wherein the plurality of flanges engages the plurality of slots when the container engages the wall.

11. The coupling assembly of claim 10, wherein the plurality of slots are formed via a plurality of ribs spaced about a periphery of the at least one first port, and wherein the plurality of flanges are configured to movably engage the plurality of ribs via a rotation of plurality of flanges about a central portion of the at least one second port.

12. The coupling assembly of claim 11, further comprising:
    a transmission assembly disposed in the wall and operably coupled with the plurality of flanges for controlling the rotation.

13. The coupling assembly of claim 12, wherein the transmission assembly includes a drive gear and a receiving gear, wherein the receiving gear is fixed with the plurality of flanges and the drive gear is operably coupled with the receiving gear to rotate the receiving gear.

14. The coupling assembly of claim 13, wherein the transmission assembly further includes an actuation device configured to actuate the drive gear in response to an electrical or a mechanical input.

15. The coupling assembly of claim 14, further comprising:
    a proximity sensor configured to detect a position of the container, wherein a controller of the climate control system is configured to communicate a signal to the actuation device to actuate the drive gear to lock the plurality of flanges with the plurality of ribs in response to the container engaging the wall.

16. The coupling assembly of claim 1, further comprising:
    a cover for selectively closing the at least one second port; and
    a lever member configured disposed on the wall and coupling with the cover, wherein the lever member is configured to move the cover to selectively block and allow fluid connection between the interior and the climate control system in response to the cooler engaging the wall.

17. The coupling assembly of claim 16, further comprising:
    a biasing member biasing the lever member to block the fluid connection, wherein engaging of the cooler with the lever member moves the lever member to allow the fluid connection.

18. A coupling assembly for a vehicle, comprising:
    a cooler selectively coupling with a compartment of the vehicle and including a protrusion extending from a sidewall of the cooler, the cooler including at least one first port disposed on the protrusion and being in fluid communication with an interior of the cooler;
    an indentation formed by a wall of the compartment, the wall including at least one second port in fluid communication with a climate control system in the vehicle; and
    a securing feature configured to bias the cooler toward the wall when the cooler is coupled with the wall to maintain fluid communication between the interior and the climate control system, wherein the protrusion engages the indentation to align the cooler with the wall.

19. The coupling assembly of claim 18, wherein the securing feature includes a magnetic connection having a ferromagnetic element disposed in the cooler and a magnet disposed in the wall.

20. A coupling assembly for a vehicle, comprising:
a cooler selectively coupled with a compartment of the vehicle, the cooler including a first port in fluid communication with an interior of the cooler;
a second port disposed on a wall of the compartment in fluid communication with a climate control system in the vehicle;
a magnetic connection between the wall and the cooler; and
a positioning feature configured to align the magnetic connection, wherein the magnetic connection includes a ferromagnetic element disposed about the first port and a magnet disposed about the second port.

* * * * *